United States Patent
Munoz et al.

(10) Patent No.: US 9,372,610 B2
(45) Date of Patent: Jun. 21, 2016

(54) MEDIA SYSTEM CONTROLLER INTERFACE

(71) Applicant: Sonos, Inc., Santa Barbara, CA (US)

(72) Inventors: Jaime Munoz, Seattle, WA (US);
Jonathan D. Garn, North Bend, WA (US); Michael Lemmon, Seattle, WA (US)

(73) Assignee: Sonos, Inc., Santa Barbara, CA (US)

(*) Notice: Subject to any disclaimer, the term of this patent is extended or adjusted under 35 U.S.C. 154(b) by 307 days.

(21) Appl. No.: 14/186,970

(22) Filed: Feb. 21, 2014

(65) Prior Publication Data
US 2015/0242073 A1    Aug. 27, 2015

(51) Int. Cl.
| | |
|---|---|
| *G06F 3/00* | (2006.01) |
| *G06F 3/0484* | (2013.01) |
| *G06F 3/0488* | (2013.01) |
| *G06F 3/0482* | (2013.01) |
| *G06F 3/16* | (2006.01) |

(52) U.S. Cl.
CPC .......... *G06F 3/04847* (2013.01); *G06F 3/0482* (2013.01); *G06F 3/0488* (2013.01); *G06F 3/165* (2013.01); *H04R 2227/003* (2013.01); *H04R 2227/005* (2013.01); *H04R 2420/07* (2013.01)

(58) Field of Classification Search
CPC .................................................. G06F 3/0488
USPC ................................................. 715/716, 777
See application file for complete search history.

(56) References Cited

U.S. PATENT DOCUMENTS

| | | | |
|---|---|---|---|
| 5,140,678 A | * | 8/1992 | Torres ................... G06F 3/0481 715/776 |
| 5,923,902 A | | 7/1999 | Inagaki |
| 6,025,838 A | | 2/2000 | Bardon et al. |
| 6,256,554 B1 | | 7/2001 | DiLorenzo |
| 6,404,811 B1 | | 6/2002 | Cvetko et al. |
| 6,522,886 B1 | | 2/2003 | Youngs et al. |
| 6,611,537 B1 | | 8/2003 | Edens et al. |
| 6,631,410 B1 | | 10/2003 | Kowalski et al. |

(Continued)

FOREIGN PATENT DOCUMENTS

WO            0153994            7/2001

OTHER PUBLICATIONS

"AudioTron Quick Start Guide, Version 1.0", Voyetra Turtle Beach, Inc., Mar. 2001, 24 pages.

(Continued)

*Primary Examiner* — William Titcomb
(74) *Attorney, Agent, or Firm* — McDonnell Boehnen Hulbert & Berghoff LLP (57) ABSTRACT

Embodiments are provided for media playback controller interfaces, interface layouts, and interactions for facilitating a user's navigation and control of a media playback system. Implementation of a controller interface may involve displaying in an information window, content associated with a first tab at a position directly above the information window, displaying a second tab at a position directly below the information window, and in response to a first input, causing (i) the second tab to be displayed at a position directly below the first tab, (ii) the information window to be displayed at a position directly below the second tab, and (iii) the information window to display content associated with the second tab. Other configurations of tab and information window displays, some of which may be modified in response to user interactions with the controller interface, are also provided.

20 Claims, 8 Drawing Sheets

(56) References Cited

U.S. PATENT DOCUMENTS

| | | | |
|---|---|---|---|
| 6,757,517 | B2 | 6/2004 | Chang |
| 6,778,869 | B2 | 8/2004 | Champion |
| 6,809,724 | B1 * | 10/2004 | Shiraishi ............... G06F 1/163 345/157 |
| 7,130,608 | B2 | 10/2006 | Hollstrom et al. |
| 7,130,616 | B2 | 10/2006 | Janik |
| 7,143,939 | B2 | 12/2006 | Henzerling |
| 7,236,773 | B2 | 6/2007 | Thomas |
| 7,483,538 | B2 | 1/2009 | McCarty et al. |
| 7,545,440 | B2 | 6/2009 | Kim et al. |
| 7,560,637 | B1 | 7/2009 | Robbin et al. |
| 7,571,014 | B1 | 8/2009 | Lambourne et al. |
| 7,643,894 | B2 | 1/2010 | Braithwaite et al. |
| 7,657,910 | B1 | 2/2010 | McAulay et al. |
| 7,788,582 | B2 | 8/2010 | Robbin et al. |
| 7,853,341 | B2 | 12/2010 | McCarty et al. |
| 7,956,272 | B2 | 6/2011 | Wysocki et al. |
| 8,014,423 | B2 | 9/2011 | Thaler et al. |
| 8,017,852 | B2 | 9/2011 | Yamashita et al. |
| 8,045,952 | B2 | 10/2011 | Qureshey et al. |
| 8,103,009 | B2 | 1/2012 | McCarty et al. |
| 8,234,395 | B2 | 7/2012 | Millington |
| 8,276,076 | B2 | 9/2012 | Torrens et al. |
| 8,634,944 | B2 | 1/2014 | Bull et al. |
| 8,683,378 | B2 | 3/2014 | Bull et al. |
| 8,766,079 | B2 | 7/2014 | Utsuki et al. |
| 8,910,068 | B2 * | 12/2014 | Shin ................ G06F 3/04883 715/765 |
| 8,954,855 | B2 | 2/2015 | Shirai et al. |
| 8,977,963 | B1 | 3/2015 | Joyce et al. |
| 9,052,810 | B2 * | 6/2015 | Reimann ............... G06F 3/0486 |
| 9,247,363 | B2 * | 1/2016 | Triplett ................ H04L 12/28 |
| 2001/0042107 | A1 | 11/2001 | Palm |
| 2002/0022453 | A1 | 2/2002 | Balog et al. |
| 2002/0026442 | A1 | 2/2002 | Lipscomb et al. |
| 2002/0124097 | A1 | 9/2002 | Isely et al. |
| 2003/0157951 | A1 | 8/2003 | Hasty |
| 2004/0024478 | A1 | 2/2004 | Hans et al. |
| 2006/0156239 | A1 | 7/2006 | Jobs et al. |
| 2007/0142944 | A1 | 6/2007 | Goldberg et al. |
| 2008/0282179 | A1 * | 11/2008 | Kim ................... G06F 3/0481 715/769 |
| 2010/0295805 | A1 * | 11/2010 | Shin .................. G06F 3/04883 345/173 |
| 2010/0299639 | A1 * | 11/2010 | Ramsay ............... G06F 3/0486 715/835 |
| 2011/0041092 | A1 * | 2/2011 | Zhang ................. G06F 3/0481 715/777 |
| 2011/0143653 | A1 | 6/2011 | Lane et al. |
| 2013/0047087 | A1 | 2/2013 | Yamahara et al. |
| 2013/0198268 | A1 | 8/2013 | Hyman |
| 2013/0198632 | A1 | 8/2013 | Hyman |
| 2015/0149901 | A1 | 5/2015 | Otto et al. |

OTHER PUBLICATIONS

"AudioTron Reference Manual, Version 3.0", Voyetra Turtle Beach, Inc., May 2002, 70 pages.

"AudioTron Setup Guide, Version 3.0", Voyetra Turtle Beach, Inc., May 2002, 38 pages.

Jo J., et al., "Synchronized One-to-many Media Streaming with Adaptive Playout Control," Proceedings of SPIE, 2002, vol. 4861, pp. 71-82.

"UPnP; "Universal Plug and Play Device Architecture"; Jun. 8, 2000; version 1.0; Microsoft Corporation; pp. 1-54".

"U.S. Appl. No. 13/904,896, filed May 29, 2013, "Playback queue control via a playlist on a mobile device" Kumar et al.".

"U.S. Appl. No. 13/904,909, filed May 29, 2013, "Playback Queue Control Transition" Kumar et al.".

"U.S. Appl. No. 13/904,923, filed May 29, 2013, "Connected State Indicator" Kumar et al.".

"U.S. Appl. No. 13/904,932, filed May 29, 2013, "Moving a Playback Queue to a New Zone" Kumar et al.".

"U.S. Appl. No. 13/904,936, filed May 29, 2013, "Private Queue Indicator" Kumar et al.".

"U.S. Appl. No. 13/904,944, filed May 29, 2013, "Playlist Modification" Kumar et al.".

"U.S. Appl. No. 13/904,949, filed May 29, 2013, "Playback Zone Silent Connect" Kumar et al.".

"U.S. Appl. No. 14/194,257, filed Feb. 28, 2014, "Playback Zone Representations" Kumar et al.".

AudioTron Setup Guide, Version 3.0, Voyetra Turtle Beach, Inc., May 2002, 38 pages.

"Bluetooth. "Specification of the Bluetooth System: The ad hoc Scatternet for affordable and highly functional wireless connectivity" Core, Version 1.0 A, Jul. 26, 1999, 1068 pages". (in four parts due to size).

"Bluetooth. "Specification of the Bluetooth System: Wireless connections made easy" Core, Version 1.0 B, Dec. 1, 1999, 1076 pages". (in four parts due to size).

"Dell, Inc. "Dell Digital Audio Receiver: Reference Guide" Jun. 2000, 70 pages". (in two parts due to size).

"Dell, Inc. "Start Here" Jun. 2000, 2 pages".

"Jones, Stephen. "Dell Digital Audio Receiver: Digital upgrade for your analog stereo" Analog Stereo. Jun. 24, 2000 <http://www.reviewsonline.com/articles/961906864.htm> retrieved Jun. 18, 2014, 2 pages".

"Louderback, Jim. "Affordable Audio Receiver Furnishes Homes With MP3" TechTV Vault. Jun. 28, 2000 <http://www.g4tv.com/articles/17923/affordable-audio-receiver-furnishes-homes-with-mp3/> retrieved Jul. 10, 2014, 2 pages".

"Palm, Inc. "Handbook for the Palm VII Handheld" May 2000, 311 pages".

"Presentations at WinHEC 2000 May 2000, 138 pages".

* cited by examiner

MEDIA SYSTEM CONTROLLER INTERFACE

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were severely limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from virtually unlimited sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

The drawings are for the purpose of illustrating example embodiments, but it is understood that the inventions are not limited to the arrangements and instrumentality shown in the drawings.

DETAILED DESCRIPTION

I. Overview

Embodiments described herein involve media playback controller interfaces, interface layouts, and interactions for facilitating a user's navigation and control of a media playback system. In media playback systems, such as the illustrative examples discussed below in section II, a user may enjoy media content in different playback zones, in user-specified orders, and from different content sources, among others. To control and manage the media playback system, the user may access the media playback system through interactions with a controller interface on a network computing device. Given the plethora of control options, a relatively simple, yet comprehensive controller interface may be beneficial for the user to easily navigate and configure media content to be played by the media playback system, and playback zones within which to play the media content.

Figure 4:
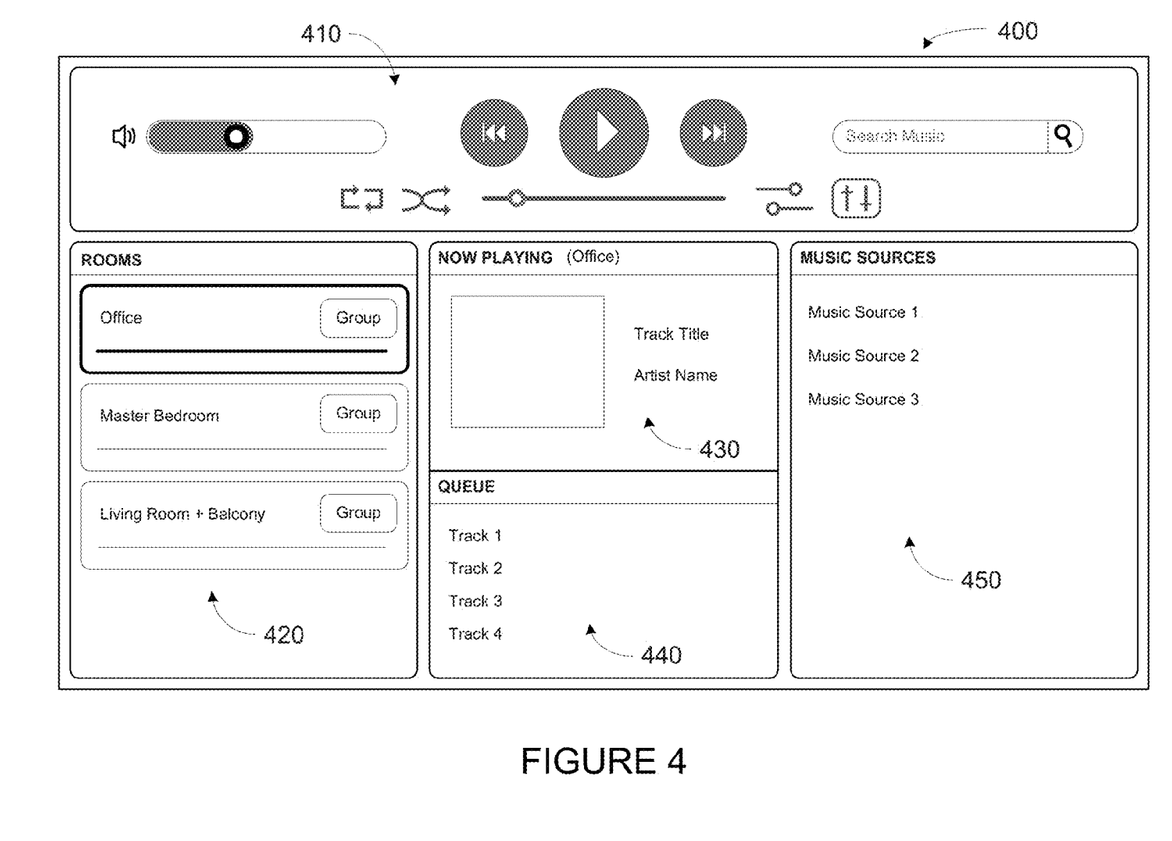
FIG. 4 shows an example controller interface.

FIG. 4, as will be discussed in further detail below, provides an example controller interface 400 that may be accessed by the user to control and manage the media playback system. In this illustrative example, the layout of the controller interface 400 allows the user to easily see, in a single view, a region showing playback zones in the media playback system, a region showing media content being played in a particular playback zone, a region showing a playback queue of media content for the particular playback zone, and a region showing media content sources available for access by the media playback system. The user may also easily interact with the controller interface 400 to manage playback of media content, navigate between playback zones, combine or separate playback zones, and browse media content available from various media content sources within the single view layout of the controller interface 400.

In some cases, however, a layout such as that of the controller interface 400 may be less than ideal if the user is accessing the media playback system using a network device with a smaller display, such as a smart phone, because there may not be enough space on the display to effectively provide all the different regions of the controller interface.

As such, a controller interface layout is provided to effectively display control regions on a smaller displays. The controller interface includes constantly displayed tabs representing the different regions, but only display content associated with one of the tabs at a time. The user may then interact with the interface to navigate among content associated with the different respective tabs.

For example, in one embodiment, a first tab may be a playback zones tab, and a second tab displayed directly below the first tab, may be a media content playback tab. Directly below the media content playback tab, an information window may display content associated with media content playback, such as for example, metadata indicating a track title, a track artist, a track album, and/or an album art, among others, associated with media content that is currently being played in a particular playback zone of the media content. In some embodiments, the information window associated with the media content playback tab may also include selectable control icons for controlling playback of the media content being played in the particular playback zone.

If the user wishes to view the different playback zones in the media playback system, the user may interact with the controller interface, such as via a touch or swipe input, to cause the media content playback tab to shift downwards, collapsing and hiding the information window that displays content associated with media content playback, and reveal an information window directly below the playback zones tab (and above the media content playback tab) displaying content associated with the different playback zones in the media playback system, including the particular playback zone in which the media content is currently being played.

The controller interface in this example may further include additional tabs associated with content that may be displayed or hidden according to the user's interactions with the controller interface. While only a single information window is displayed at a time, the tabs are constantly displayed, allowing the user to navigate between the tabs and their associated content quickly and easily. In some embodiments, the displayed tabs may be dynamically updated to indicate relevant content. For instance, when the information window is displaying content associated with the different playback zones in the media playback system, the media content playback tab can indicate media content currently playing in a particular playback zone that is selected in the information window. Analogously, when the information window is displaying content associated with media content that is currently being played in a particular playback zone of the media content, the playback zones tab may indicate the particular playback zone in which the media content is being played. Other examples are also possible.

In one example, the different regions of the controller interface 400 may each be provided as individual tabs. In another example, control options and other information related to the media playback system may be organized differently. For instance, a playback queue for a playback zone or room of the media playback system may be accessible via a selectable icon displayed among content associated with a playback zones tab or a now playing tab, rather than via a dedicated playback queue tab. Other examples are also possible.

As indicated, the present application involves providing a controller interface for controlling a media playback system. It is understood that embodiments described in the present application may be useful in other applications, especially when the interface is designed to accommodate limited screen size and there are a number of related topics with content that is to be displayed.

In one aspect, a computer-implemented method is provided. The method involves displaying in an information window, content associated with a first tab. The first tab is at a position directly above the information window. The method also involves displaying a second tab at a position directly below the information window, and in response to a first input, causing (i) the second tab to be displayed at a position directly below the first tab, (ii) the information window to be displayed at a position directly below the second tab, and (iii) the information window to display content associated with the second tab.

In another aspect, a second computer-implemented method is provided. The method involves displaying a second tab at a position directly below a first tab, and displaying in an information window, content associated with the second tab. The information window is at a position directly below the second tab. The method also involves in response to a first input, causing (i) the information window to be displayed at a position directly below the first tab, (ii) the information window to display content associated the first tab, and (iii) the second tab to be displayed at a position directly below the information window.

In yet another aspect, a non-transitory computer readable memory is provided. The non-transitory computer readable memory has stored thereon instructions executable by a computing device to cause the computing device to perform functions. The functions include displaying a first title region at a first location, displaying a second title region at a second location, and displaying in a content region, content associated with the first title region. The content region is at a third location between the first location and the second location. The functions also include in response to a first input, (i) displaying the second title region at a fourth location directly below the first location, (ii) displaying the content region at a fifth location directly below the fourth location, and (iii) displaying in the content region, content associated with the second title region.

It will be understood by one of ordinary skill in the art that this disclosure includes numerous other embodiments.

II. Example Operating Environment

Figure 1:
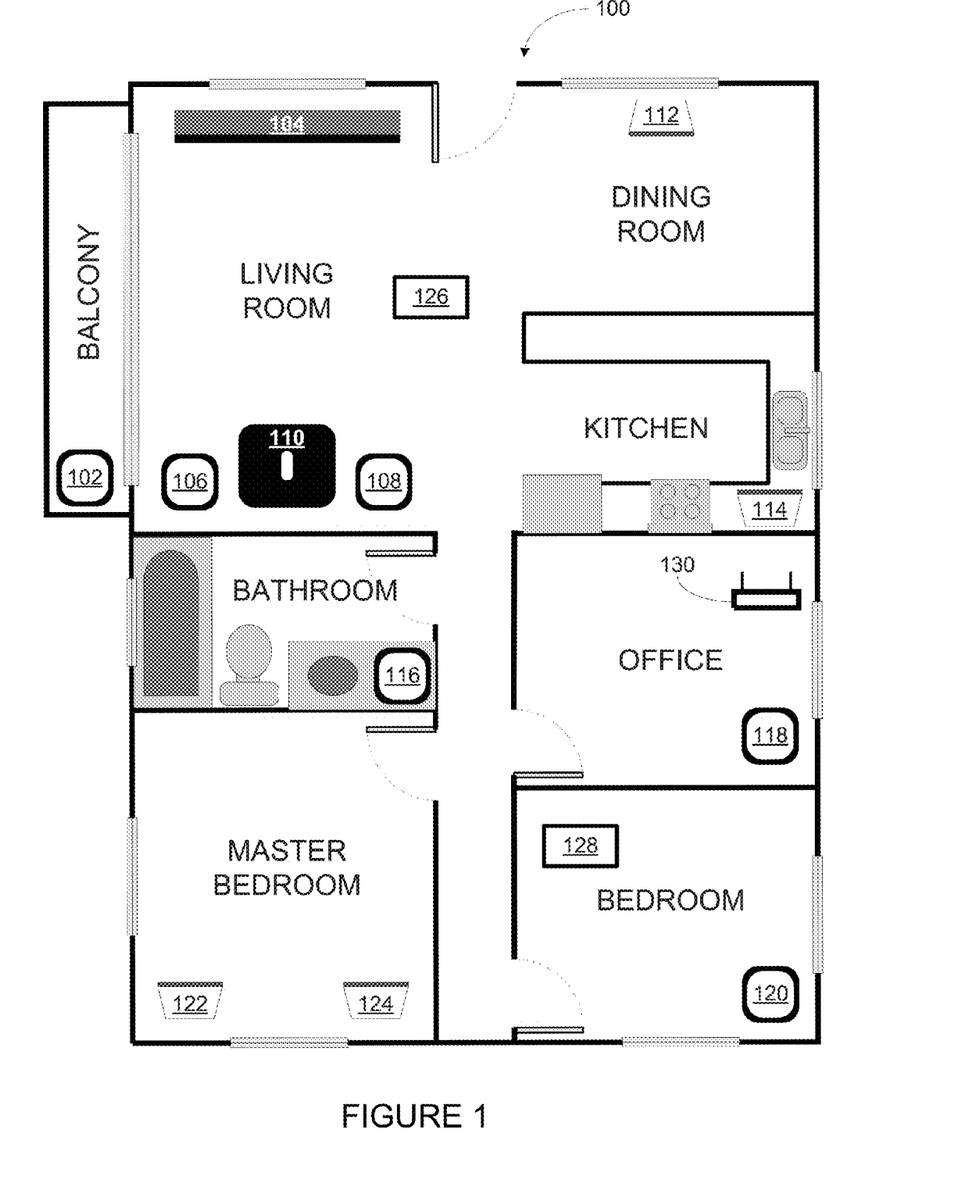
FIG. 1 shows an example media playback system configuration in which certain embodiments may be practiced.

FIG. 1 shows an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
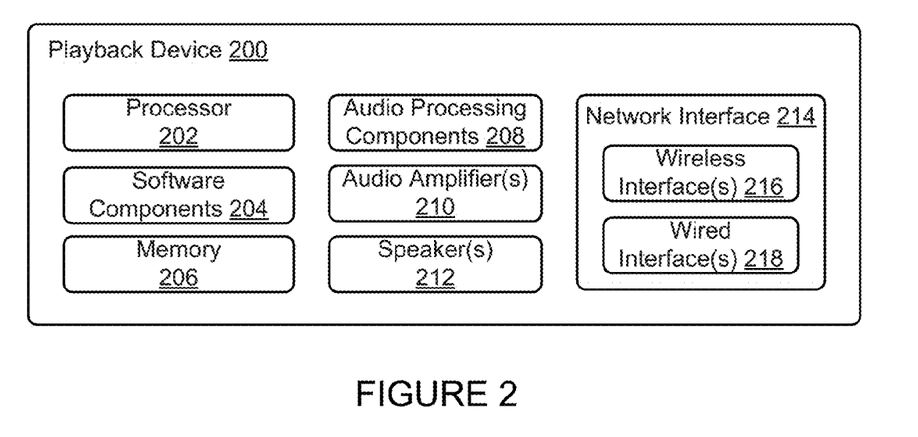
FIG. 2 shows a functional block diagram of an example playback device.

FIG. 2 shows a functional block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, and a network interface 214 including wireless interface(s) 216 and wired interface(s) 218. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11 ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
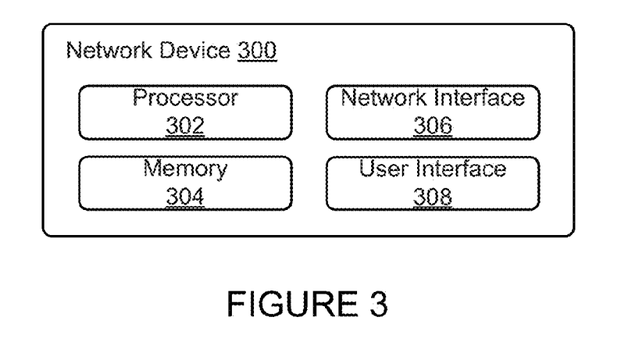
FIG. 3 shows a functional block diagram of an example control device.

FIG. 3 shows a functional block diagram of an example control device 300 that may be configured to be one or both of the control devices 126 and 128 of the media playback system 100. As shown, the control device 300 may include a processor 302, memory 304, a network interface 306, and a user interface 308. In one example, the control device 300 may be a dedicated controller for the media playback system 100. In another example, the control device 300 may be a network device on which media playback system controller application software may be installed, such as for example, an iPhone™, iPad™ or any other smart phone, tablet or network device (e.g., a networked computer such as a PC or Mac™).

The processor 302 may be configured to perform functions relevant to facilitating user access, control, and configuration of the media playback system 100. The memory 304 may be configured to store instructions executable by the processor 302 to perform those functions. The memory 304 may also be configured to store the media playback system controller application software and other data associated with the media playback system 100 and the user.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a net-worked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

III. Example Media Playback Controller Interfaces

As discussed above, embodiments described herein may involve media playback controller interfaces, interface layouts, and interactions for facilitating a user's navigation and control of a media playback system.

Figure 5:
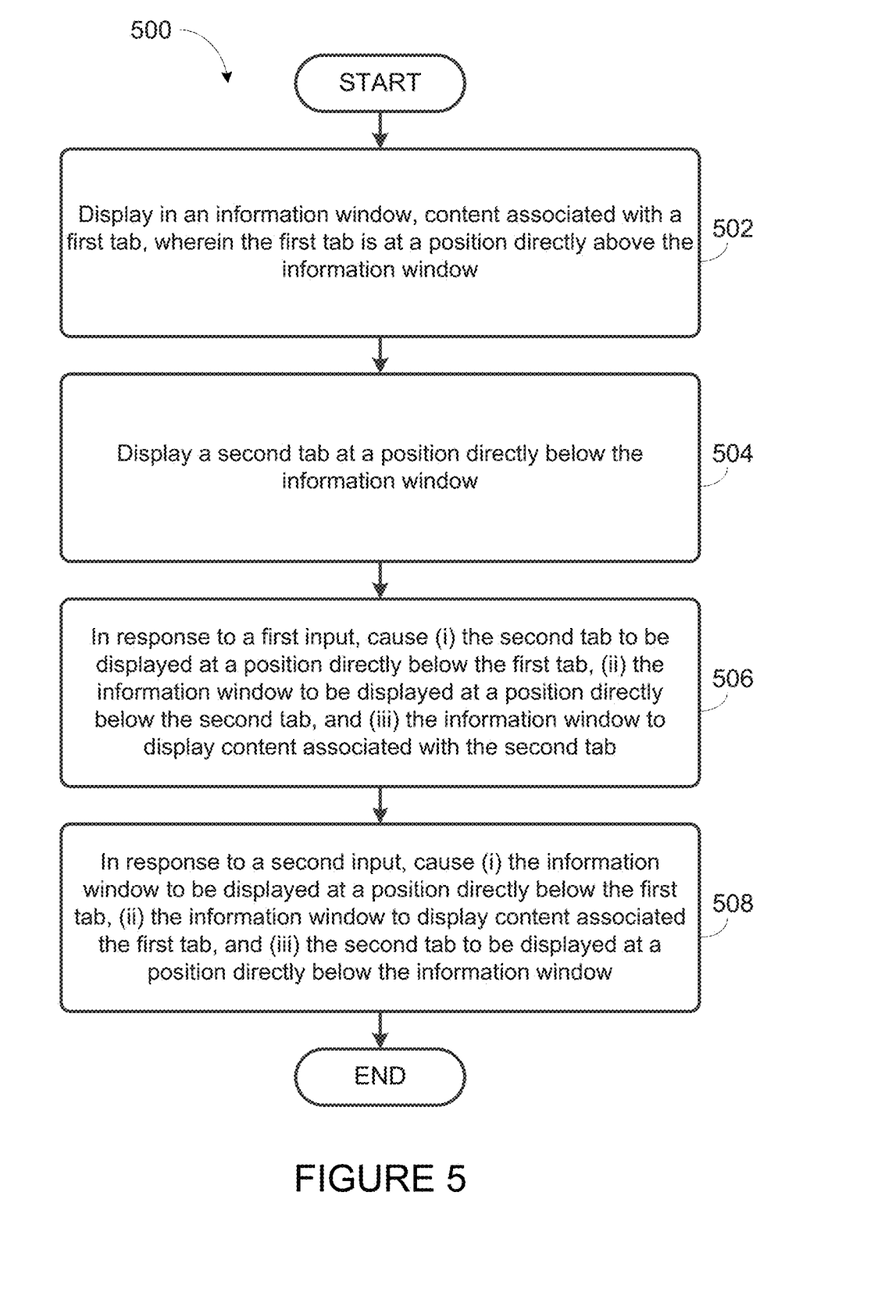
FIG. 5 shows an example flow diagrams for providing a media system controller interface.

FIG. 5 shows an example flow diagram for providing a media system controller interface. Method 500 shown in FIG. 5 presents an embodiment of a method that can be implemented within an operating environment involving, for example, the media playback system 100 of FIG. 1, one or more of the playback device 200 of FIG. 2, and one or more of the control device 300 of FIG. 3. Method 500 may include one or more operations, functions, or actions as illustrated by one or more of blocks 502-508. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 500 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 500 and other processes and methods disclosed herein, each block in FIG. 5 may represent circuitry that is wired to perform the specific logical functions in the process.

Figure 6A:
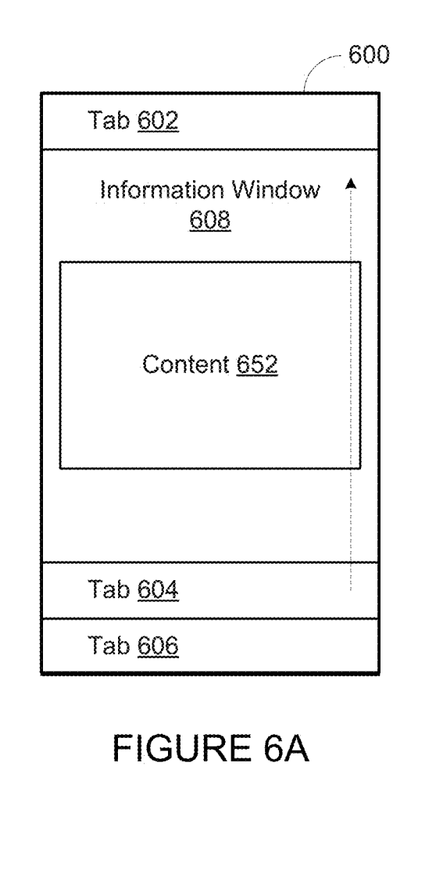
FIGS. 6A, 6B, and 6C show a series of example interface interactions.

At block 502, the method 500 involves displaying in an information window content associated with a first tab. FIG. 6A shows an example interface 600 with a tab 602, a tab 604, a tab 606, and an information window 608. FIG. 6A also shows content 608 displayed in the information window 608. In this example, the first tab may be the tab 602, and the information window may be the information window 608. As shown, the first tab 602 is at a position directly above the information window 608. Accordingly, the content 608 displayed in the information window 608 is associated with the tab 602 positioned directly above the information window 608. In some cases, the tab 602 may include a title region associated with the content 608 provided in the information window 608, indicating information associated with the content 608. In some discussions herein, an information window such as the information window 608 may also be referred to a content region associated with the title region or tab 602.

At block 604, the method 500 involves displaying a second tab at a position directly below the information window. As shown in FIG. 6A, the second tab may be the tab 604 directly below the information window 608. As also shown in FIG. 6A, the tab 606 may be a third tab that is at a position directly below the second tab 604. As indicated previously, content displayed in the information window 608 is associated with the first tab 602, and content associated with tabs 604 and 606 may not displayed when content 652 is displayed. Accordingly, if the user wishes to view content associated with either tab 604, or tab 606, the user may need to interact with the interface to do so.

Interactions with the controller interface to view content associated with either tab 604 or tab 606 may include a touch input, a flick input, a drag input, or some other input in relation to either tab 604 or tab 606. For example, if the user wishes to see content associated with tab 604, the user may select tab 604 by touching or tapping the tab 604. Alternatively, the user may flick or drag the tab 604 upwards away from the tab 606 to "reveal" and view content associated with tab 604. Similarly, the user may touch or tap the tab 606, or flick or drag the tab 606 upwards away from the bottom of the interface 600 to reveal and view content associated with tab 606. Other examples are also possible.

Figure 6B:
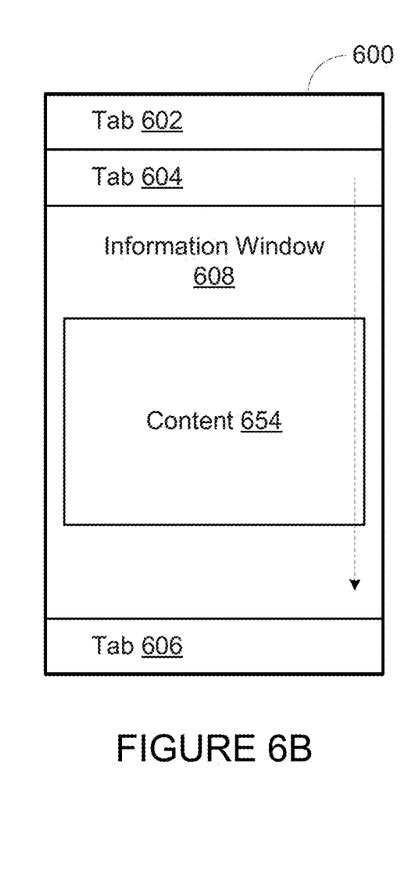

At block 506, the method 500 involves, in response to the first input, causing (i) the second tab to be displayed at a position directly below the first tab, (ii) the information window to be displayed at a position directly below the second tab, and (iii) the information window to display content associated with the second tab. In one example, the first input may include the user input or interaction to view content associated with tab 604. Accordingly, as shown in FIG. 6B, the second tab 604 is directly below the first tab 602, the information window 608 is directly below the second tab 604, and the information window 608 is displaying content 654 that is associated with tab 604. Also shown is the third tab 506 directly below the information window 654.

In this case, if the user wishes to view the content 652 associated with the first tab 602 again, the user can further interact with the interface to do so. For instance, the user can select tab 602 by touching or tapping the tab 602. Alternatively, the user may flick or drag the tab 604 downward, away from the tab 602 to reveal and view content associated with tab 602.

Figure 6C:
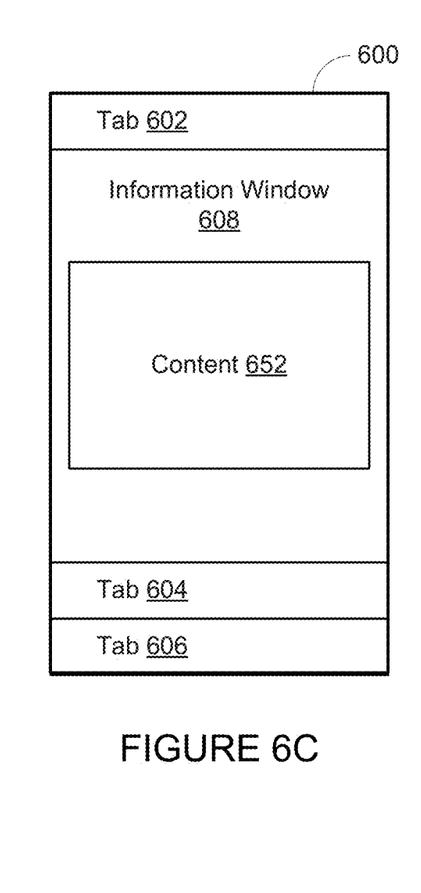

At block 508, the method 500 involves, in response to a second input, causing (i) the information window to be displayed at the position directly below the first tab, (ii) the information window to display content associated the first tab to be display, and (iii) the second tab to be displayed at the position directly below the information window. In one example, the second input may include the user input or interaction to view content associated with tab 602. Accordingly, as shown in FIG. 6C, the information window 608 is once again directly below the first tab 602 and displaying the content 652 associated with the tab 602. Also as shown, the second tab 604 is directly below the information window 608, and the the third tab 606 directly below the second tab 604.

From the controller interface 600 shown in FIG. 6C, the user may once again view the content 654 associated with the second tab 604 using inputs or interactions described above in connection to block 506. Similarly, the user may view content associated with tab 606 using inputs or interactions such as a touch or tap on the tab 606, or a flick or drag of the tab 606 upwards away from the bottom of the interface 600 to show content associated with tab 606. In addition to merely viewing content associated with each of the different tabs 602, 604, and 606 of the interface 600, the user may in some cases, as will be discussed below, interact with the displayed content. Other examples are also possible.

Figure 7A:
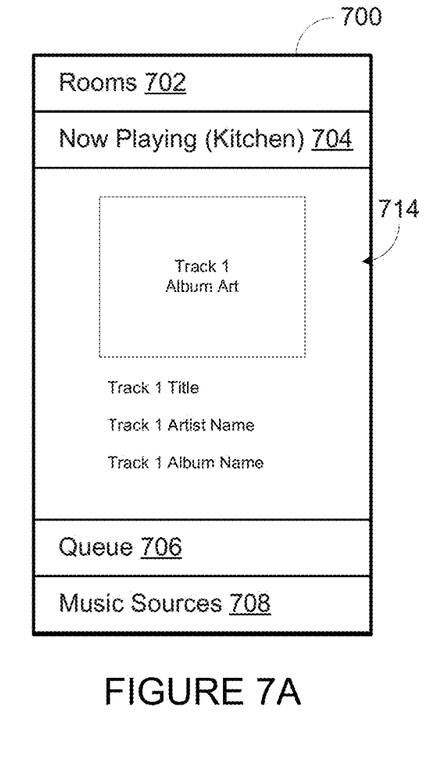
FIGS. 7A, 7B, 7C, 7D, 7E, and 7F show a series of example media system controller interfaces.
Figure 7B:
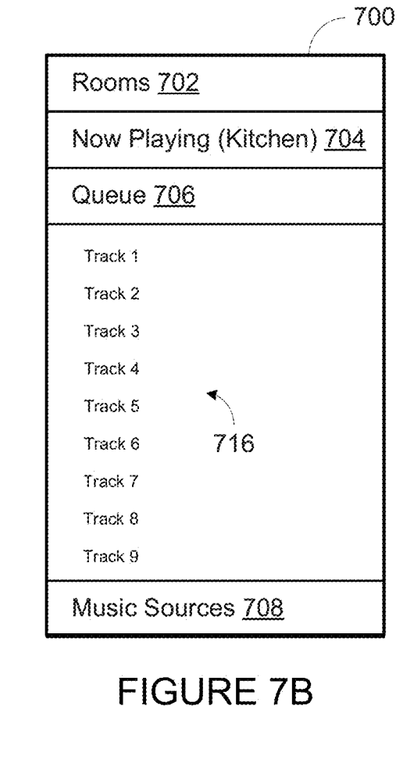

As indicated above, the present application involves media playback controller interfaces, interface layouts, and interactions for facilitating a user's navigation and control of a media playback system. FIGS. 7A-7F show a series of example media system controller interfaces. As shown in FIG. 7A, an interface 700 includes a Rooms tab 702, a Now Playing tab 704, a Queue tab 706, and a Music Sources tab 708. In this example, a displayed information window directly below the Now Playing tab 704 may include content 714 associated with the Now Playing tab 704, such as for example, album art, title, artist name, and album name information for "Track 1" that is currently being played by the media playback system. Also as shown, a title region of the Now Playing tab 704 may indicate that "Track 1" is currently being played in a "Kitchen" playback zone of the media playback system. In some cases, the user may control playback of the currently playing media content while viewing the information window. For instance, a tap input on the displayed album art may cause selectable icons for skip back, pause/play, and/or skip forward controls to appear in the information window. Other examples are also possible.

If the user then wishes to view the playback queue associated with the "Kitchen" playback zone, the user may interact with the interface 700 as discussed previously in connection to method 500 and FIGS. 6A-6C to cause the information window to display content 716 associated with the Queue tab 706. As shown, content 716 may include a list of various tracks in the playback queue associated with the "Kitchen" playback zone, as indicated in the title region of the Now Playing tab 704. Within the information window displaying content 716, the user may interact with the listed tracks to remove or reorder one or more of the listed tracks.

Figure 7C:
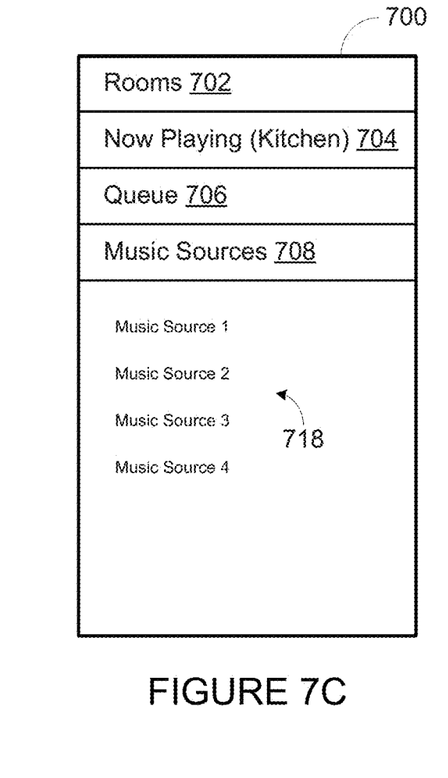

If the user wishes to browse media content available on different music sources that the media playback system is configured to retrieve media content for playback, the user can interface with the interface 700 to cause the information window to display content 718 associated with the Music Sources tab 708. As shown in FIG. 7C, content 718 may include a list of available music sources. The user may then interact with the listed music sources to browse and select media content to be added to the playback queue associated with the "Kitchen" playback zone and/or played immediately in the "Kitchen" playback zone.

Figure 7D:
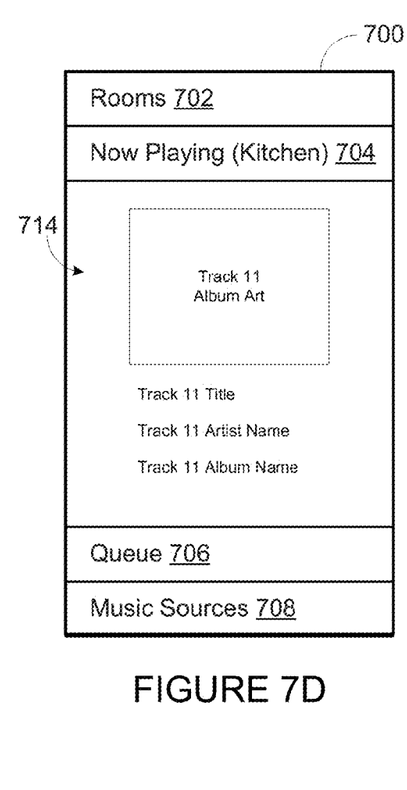

In one illustrative example, the user may have browsed through some of the music sources included in content 718 and displayed in the information window, and may have chosen a "Track 11" to be played in the "Kitchen" playback one. Upon selecting "Track 11" to be played, the interface may automatically, or in response to further user interaction, display in the information window content 714 associated with the Now Playing tab, as shown in FIG. 7D. The content 714 may now include album art, title, artist name, and album name information for "Track 11" that is currently being played by the media playback system.

Figure 7E:
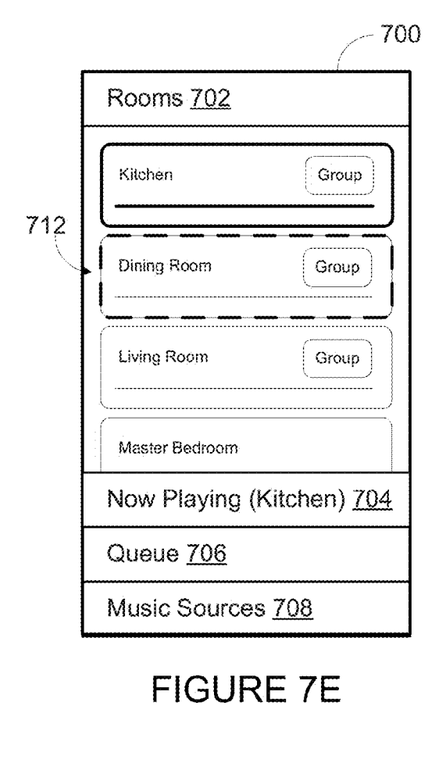

The user may then decide that "Track 11" should be played in additional playback zones. As such, the user may interact with the interface 700 to cause the information window to display content 712 associated with the Rooms tab 702. As shown in FIG. 7E, content 712 may include each of the playback zones in the media playback system. In one example, the user may select a displayed playback zones to further configure the playback zone. In one case, as shown, the user may select the "Dining Room" playback zone to also play "Track 11," in synchrony with the playback of "Track 11" in the "Kitchen" playback zone. In other words, the user may group the "Kitchen" playback zone and the "Dining Room" playback one together such that the two playback zones play media content such as in this case, "Track 11" in synchrony.

Figure 7F:
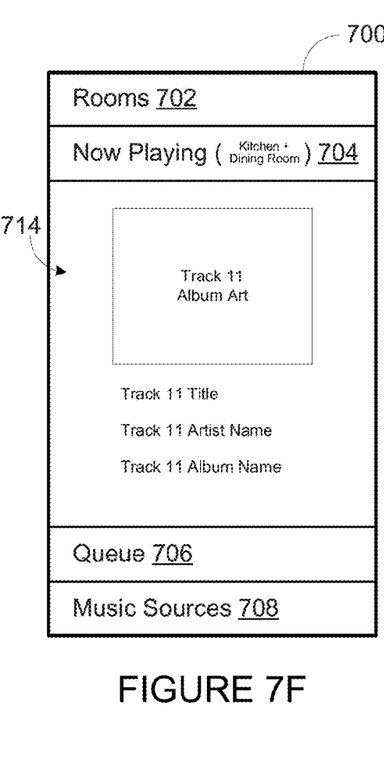

Upon grouping the "Kitchen" playback zone and the "Dining Room" playback zone together to play "Track 11" in synchrony, the interface may automatically, or in response to further user interaction, display again in the information window content 714, as shown in FIG. 7F. As also shown in FIG. 7F, the title region of the Now Playing tab 704 has been updated to indicate that "Track 11" is now being played in a "Kitchen+Dining Room" playback zone.

FIGS. 7A-7F provide just one illustrative example of how the media controller interface may be implemented according to the layout discussed above in connection to method 500 and FIGS. 6A-6C, and how the user may interact with such a controller interface. In this particular example, the interface 700 provides an alternative layout to displaying the content and information provided by the controller interface 400 of FIG. 4. As suggested previously, the single view layout of the controller interface 400 may be suitable for a network device having a sufficiently large display, while the layout shown in FIGS. 7A-7F may be more suitable for network devices having smaller displays.

Figure 8A:
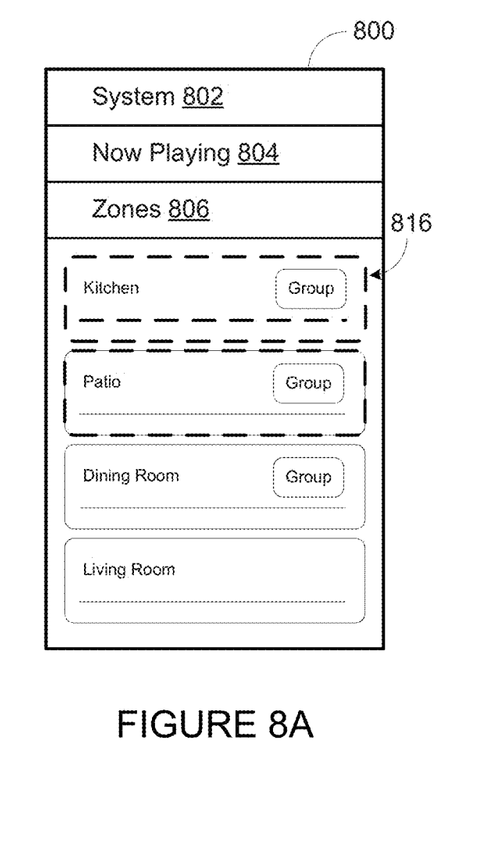
FIGS. 8A, 8B, and 8C show another series of example media system controller interfaces.
Figure 8B:
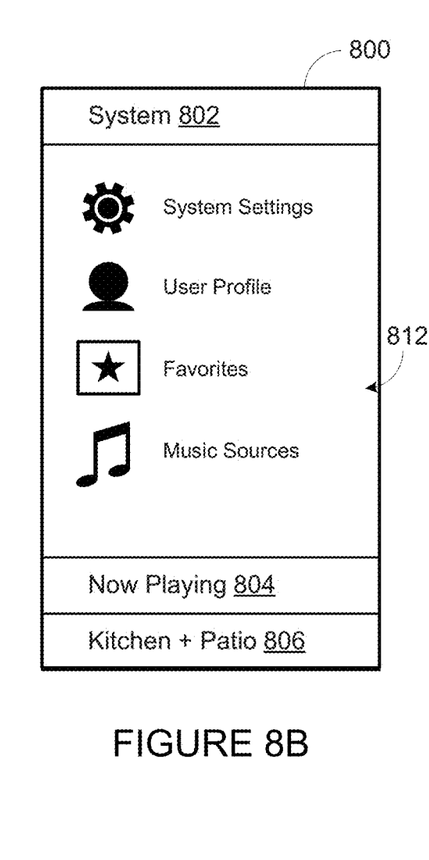
Figure 8C:
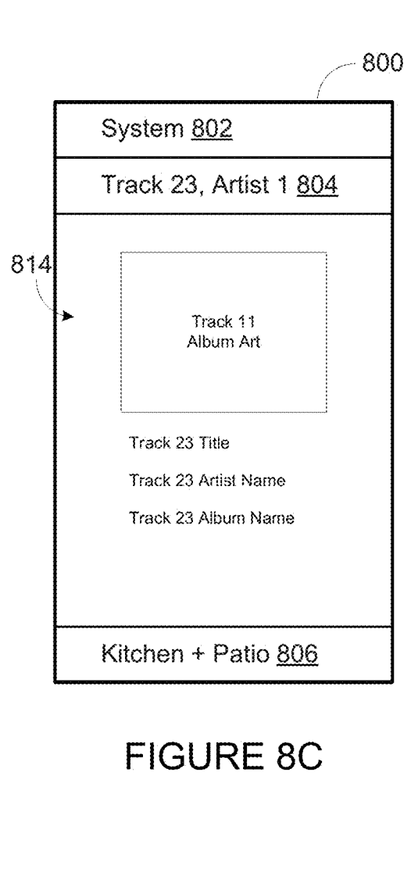

Nevertheless, other example media system controller interface configurations may be implemented. FIGS. 8A-8C show another series of example media system controller interfaces. As shown in FIG. 8A, interface 800 includes a System tab 802, a Now Playing tab 804, and a Zones tab 806. In this example, the Zones tab 806 may be similar to the Rooms tab 702 of FIGS. 7A-7F. Accordingly, as shown, content 816 associated with the Zones tab 806 may include a list of playback zones of the media playback system. In this illustrative example, the user may choose to group the "Kitchen" playback zone and the "Patio" playback zone together to play media content in synchrony.

In this series of example interfaces, different from those shown in FIGS. 7A-7F, the interface 800 may not include a designated Music Sources tab. Instead, the user may browse and select media content to be played via the System tab 802.

As such, the user may interact with the interface 800 to cause the information window to display content 812 associated with the System tab 802, as shown in FIG. 8B. Content 812 in this example may include selection options of "System Settings" to view and modify configurations of the media playback system, "User Profile" to view and modify user account information affiliated with the media playback system, "Favorites" to view and potentially select media content, playback zones, music sources, among other possibilities, that the user accesses the most, and "Music Sources" to browse and select media content for the media playback system to play. As also shown in FIG. 8B, the content region of the Zones tab 806 may indicate that any relevant configuration changes or media content selected will be applied to the "Kitchen+Patio" playback zone, previously selected in connection to the discussions of FIG. 8A.

Upon selection of media content to be played in the "Kitchen+Patio" playback zone group, the interface may automatically, or in response to further user interaction, display in the information window, content 814 associated with the Now Playing tab 804, as shown in FIG. 8C. The content 814 may be similar to the content 714 shown in FIGS. 7A, 7D, and 7F. In this case, the content region of the Now Playing tab 804 may also indicate information such as a track title and artist name of the media content selected for playback, which in this case may be "Track 23" by artist "Artist 1."

In contrast to the interface 700 of FIGS. 7A-7F, interface 800 of FIGS. 8A-8C may not have designated tabs for music sources or playback queues. Instead, as mentioned previously, the interface 800 includes a Systems tab 802 via which the user may access music sources. In this illustrative example, the interface 800 may be configured such that the user can view and modify the playback queue associated with the "Kitchen+Patio" playback zone group by interacting with selectable icons (not shown) provided in the information window displaying content 814. Other example configurations are also possible.

Further, the tabs and/or tab configurations for interfaces such as that described above in connection to method 500, FIGS. 6A-6C, FIGS. 7A-7F, and FIGS. 8A-8C may be user-customizable. In one example, a user-customizable tab may be a tab generated according to past user interactions. For instance, a user-customizable tab may include a list of the user's most frequently used playback zone configurations and/or most frequency accessed media content sources, or playlists, similar to the Favorites selection option shown in FIG. 8B.

In another example, a user-customizable tab configuration may be a configuration of tabs and organization of content associated with the respective tabs designed by the user. For example, if a user wishes to have a designated tab for one subset of playback zones in the media playback system and a designated tab for a second subset of playback zones in the media playback system, the interface may include two tabs associated with playback zones. In another example, if a user wishes to have a designated tab for a favorite music source, the interface may include a tab for the favorite music source, and a tab for all the other available music sources. In this case, content displayed in the information window when the favorite music source tab is selected may include the sub folders for the favorite music source, thereby reducing the effort and time for the user to access media content from the favorite music source. Other examples are also possible.

Further, while the discussions herein may generally refer to embodiments in which the tabs are ordered vertically (i.e. a second tab displayed directly below a first tab, etc.), one having ordinary skill in the art will appreciate that the tabs may also be ordered horizontally. For instance, a second tab may be displayed directly to the right of a first tab, and an information window displaying content associated with the second tab may be displayed directly to the right of the second tab. In such a case, if the user wishes to view content associated with the first tab, the user may interact with the controller interface, such as via a touch or swipe input, to cause the second playback tab to shift rightwards, collapsing and hiding the information window that displays content associated with second tab, and reveal an information window directly to the right of the first tab (and to the left of the second tab) displaying content associated with the first tab. Other implementations are also possible.

IV. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

As indicated, the present application involves providing a controller interface for controlling a media playback system. In one aspect, a computer-implemented method is provided. The method involves displaying in an information window, content associated with a first tab. The first tab is at a position directly above the information window. The method also involves displaying a second tab at a position directly below the information window, and in response to a first input, causing (i) the second tab to be displayed at a position directly below the first tab, (ii) the information window to be displayed at a position directly below the second tab, and (iii) the information window to display content associated with the second tab.

In another aspect, a second computer-implemented method is provided. The method involves displaying a second tab at a position directly below a first tab, and displaying in an information window, content associated with the second tab. The information window is at a position directly below the second tab. The method also involves in response to a first input, causing (i) the information window to be displayed at a position directly below the first tab, (ii) the information window to display content associated the first tab, and (iii) the second tab to be displayed at a position directly below the information window.

In yet another aspect, a non-transitory computer readable memory is provided. The non-transitory computer readable memory has stored thereon instructions executable by a computing device to cause the computing device to perform functions. The functions include displaying a first title region at a first location, displaying a second title region at a second location, and displaying in a content region, content associated with the first title region. The content region is at a third location between the first location and the second location. The functions also include in response to a first input, (i) displaying the second title region at a fourth location directly below the first location, (ii) displaying the content region at a fifth location directly below the fourth location, and (iii) displaying in the content region, content associated with the second title region.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

We claim:

1. A computer-implemented method comprising:
    displaying in an information window, content associated with a first tab, wherein the first tab is at a position directly above the information window;
    displaying a second tab at a position directly below the information window; and
    in response to a first input, causing (i) the second tab to be displayed at a position directly below the first tab, (ii) the information window to be displayed at a position directly below the second tab, and (iii) the information window to display content associated with the second tab.

2. The computer-implemented method of claim 1, further comprising:
    in response to a second input, causing (i) the information window to be displayed at the position directly below the first tab, (ii) the information window to display content associated the first tab to be display, and (iii) the second tab to be displayed at the position directly below the information window.

3. The computer-implemented method of claim 1, further comprising:
    prior to the first input, displaying a third tab at a position directly below the second tab; and
    in response to the first input, causing the third tab to be displayed at a position directly below the information window.

4. The computer-implemented method of claim 1, wherein the first tab and the second tab represent two of the following multi-zone media playback control categories: (a) system settings, (b) playback zones, (c) media content sources, (d) currently playing media content, and (e) media content playback queue.

5. The computer-implemented method of claim 1, wherein the first input and second input comprise one or more of (a) a touch input, (b) a flick input, and (c) a drag input.

6. The computer-implemented method of claim 1, wherein the first tab indicates a particular playback zone, wherein content associated with the first tab comprises one or more playback zones including the particular playback zone.

7. The computer-implemented method of claim 6, wherein the second tab indicates particular media content being played in the particular playback zone, and wherein the content associated with the second tab comprises representations of meta data associated with the particular media content.

8. The computer-implemented method of claim 6, wherein the second tab indicates a playback queue associated with the particular playback zone, and wherein the content associated with the second tab comprises representations of a queue of media content to be played in the particular playback zone.

9. The computer-implemented method of claim 1, wherein the content associated with the first tab comprises selectable options for modifying a configuration of a media playback system.

10. A computer-implemented method comprising:
    displaying a second tab at a position directly below a first tab;
    displaying in an information window, content associated with the second tab, wherein the information window is at a position directly below the second tab; and
    in response to a first input, causing (i) the information window to be displayed at a position directly below the first tab, (ii) the information window to display content associated the first tab, and (iii) the second tab to be displayed at a position directly below the information window.

11. The computer-implemented method of claim 10, further comprising:
    in response to a second input, causing (i) the information window to be displayed at the position directly below the second tab, (ii) the information window to display content associated the second tab, and (iii) the second tab to be displayed at the position directly below the first tab.

12. The computer-implemented method of claim 10, further comprising:
    prior to the first input, displaying a third tab at a position directly below the information window; and
    in response to the first input, causing the third tab to be displayed at a position directly below the second tab.

13. The computer-implemented method of claim 10, wherein the first tab and the second tab represent two of the following multi-zone media playback control categories: (a) system settings, (b) playback zones, (c) media content sources, (d) currently playing media content, and (e) media content playback queue.

14. The computer-implemented method of claim 10, wherein the first input and second input comprise one or more of (a) a touch input, (b) a flick input, and (c) a drag input.

15. The computer-implemented method of claim 10, wherein the second tab indicates a particular playback zone, wherein content associated with the second tab comprises one or more playback zones including the particular playback zone.

16. The computer-implemented method of claim 15, wherein the first tab indicates particular media content being played in the particular playback zone, and wherein the content associated with the first tab comprises representations of meta data associated with the particular media content.

17. The computer-implemented method of claim 15, wherein the first tab indicates a playback queue associated with the particular playback zone, and wherein the content associated with the first tab comprises representations of a queue of media content to be played in the particular playback zone.

18. The computer-implemented method of claim 10, wherein the content associated with the first tab comprises selectable options for modifying a configuration of a media playback system.

19. A non-transitory computer readable medium having stored thereon instructions executable by a computing device to cause the computing device to perform functions comprising:
- displaying a first title region at a first location;
- displaying a second title region at a second location;
- displaying in a content region, content associated with the first title region, wherein the content region is at a third location between the first location and the second location; and
- in response to a first input, (i) displaying the second title region at a fourth location directly below the first location, (ii) displaying the content region at a fifth location directly below the fourth location, and (iii) displaying in the content region, content associated with the second title region.

20. The non-transitory computer readable medium of claim 19, wherein the functions further comprise:
- in response to a second input, (i) displaying the second title region in the second location, (ii) displaying the content region in the third location between the first location and the second location, and (iii) displaying in the content region, content associated with the first title region.

\* \* \* \* \*